J. W. NETHERTON.
ANTISPLASHING DEVICE FOR AUTOMOBILES.
APPLICATION FILED JUNE 27, 1921.

1,429,366.

Patented Sept. 19, 1922.
2 SHEETS—SHEET 1.

Inventor
J. W. Netherton.

By
Watson E. Coleman
Attorney

J. W. NETHERTON.
ANTISPLASHING DEVICE FOR AUTOMOBILES.
APPLICATION FILED JUNE 27, 1921.
1,429,366.
Patented Sept. 19, 1922.
2 SHEETS—SHEET 2.
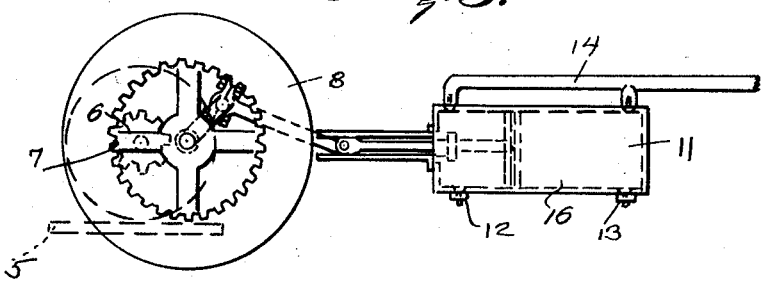
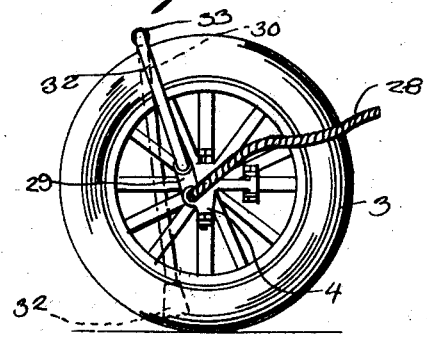
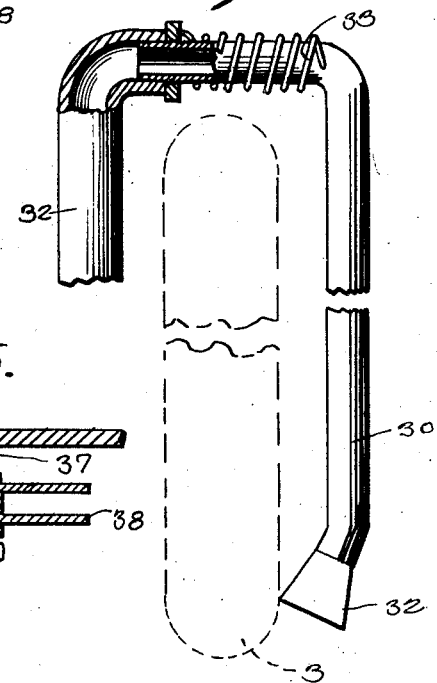
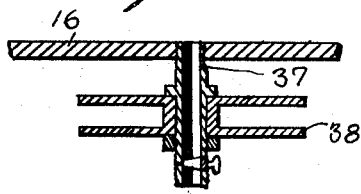
Inventor
J. W. Netherton.
By
Watson E. Coleman
Attorney Patented Sept. 19, 1922.

1,429,366

UNITED STATES PATENT OFFICE.

JOHN WILLIAM NETHERTON, OF SOUTH BEND, INDIANA, ASSIGNOR OF ONE-HALF TO HARRY C. HARDT, OF SOUTH BEND, INDIANA.

ANTISPLASHING DEVICE FOR AUTOMOBILES.

Application filed June 27, 1921. Serial No. 480,764.

*To all whom it may concern:*

Be it known that I, JOHN W. NETHERTON, a citizen of the United States, residing at South Bend, in the county of St. Joseph and State of Indiana, have invented certain new and useful Improvements in Antisplashing Devices for Automobiles, of which the following is a specification, reference being had to the accompanying drawings.

This invention relates to automobiles, and more particularly to attachments therefor adapted to prevent splashing of mud and water through which the vehicle is passing.

One of the principal objects of the invention is to provide an attachment for automobiles which is simple and efficient and by which streams of air may be directed against the ground in advance of the front and rear wheels whereby water or mud will be displaced and prevented from collecting on the wheels and thereby splashing the machine and pedestrians alongside the path of travel.

A further object of the invention is the provision of means which may be operated by the engine or through a motor connected to the storage battery of the machine whereby a supply of compressed air may be produced to prevent splashing of mud or water, as before described, and to provide a supply of air which may be utilized to fill the tires to clear the car and for various other purposes for which compressed air may be utilized in and about an automobile.

Further objects of the invention will appear as the following specific description is read in connection with the accompanying drawings in which:

Figure 3 is an enlarged detail elevational view illustrating the compressor and the parts concomitant thereto;

Figure 4 is a fragmentary elevational view illustrating a coupling carried by a steering knuckle and the parts associated therewith;

Figure 5 is an elevation partly in section showing in detail the flexible connection of air pipe which extends over the wheel to permit removal of the tire;

Figure 6 is a detail sectional view through the hose-reel.

Figure 1:
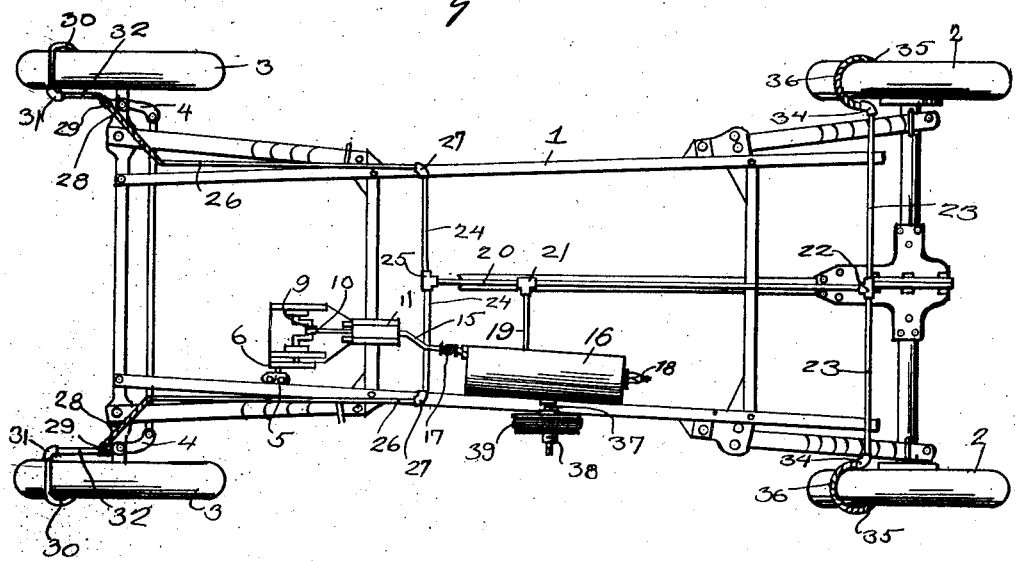
Figure 1 is a plan view showing my invention applied to a stripped chassis of an automobile.
Figure 2:
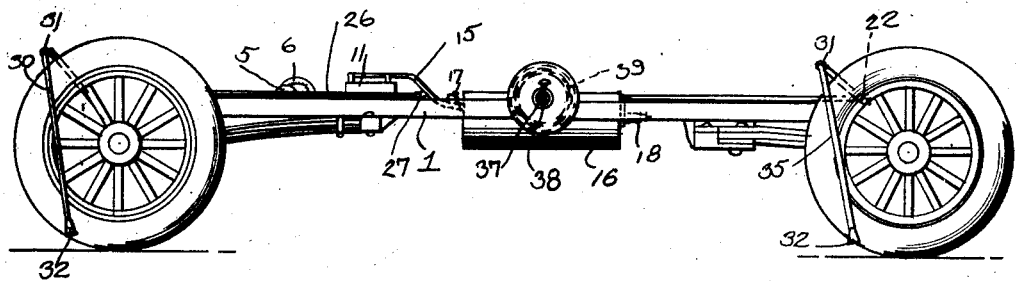
Figure 2 is a side elevation thereof.

Referring more particularly to the drawings, 1 represents the chassis of an automobile, 2 the rear wheels, and 3 the front wheels, each of the latter of which is provided with the usual steering knuckle 4.

Mounted upon the chassis at any suitable point is a motor, generally indicated at 5, having connected to the armature shaft thereof a pinion 6 which meshes with the internal gear 7 on the fly-wheel 8. This fly-wheel as is shown, is connected to the crank shaft 9, and supplied as is usual with connecting rod 10 whose opposite end carries a piston (not shown) of the compressor generally indicated at 11. This compressor is preferably of the double acting type and provided with air intake ports 12 and 13 and a discharge manifold 14 connected by pipe 15 to a supply tank 16, also mounted upon the chassis at any suitable point. While I have described this compressor as operating by a motor connected to the storage battery, it will be readily understood that suitable mechanism may be provided whereby the compressor may be operated from the engine direct, and in such instance of course I would provide a clutch in the driving shaft of the compressor so that the compressor could be disconnected when the engine was being started.

The supply tank is connected, as before stated, to the pipe 15, in which I preferably place a check valve 17 so as to prevent loss of air when the compressor is not operated. The tank is provided with a safety valve 18 which will take care of any excessive pressures.

Leading off from one side of the tank is a pipe 19 which is connected to a main 20 mounted on the chassis in any suitable manner and of proper diameter for the purpose intended. This main extends forwardly and rearwardly, being connected to the pipe 19 by a T-coupling 21, and at its rear end is connected by a T-coupling 22 to the laterals 23 leading to the rear wheel nozzles to be hereinafter described. The forward end of the pipe 20 is connected to the laterals 24 by a T-coupling 25, which are in turn connected to the forward extension pipes by elbows 27. These forward extensions lie alongside the chassis and extend to a point adjacent the front axle where they are connected to the flexible pipes 28 which have their forward terminals secured to a coupling 29 carried upon the steering knuckle 4. The flexible pipes 28 are provided to permit turning of the wheels. To each coupling 29 is joined a wheel-yoke pipe 30 provided intermediate its end and at a point over the tire, with a flexible joint 31 which permits the outer arm carrying the nozzle 32 to swing upwardly and out of the way when it is desired to change tires. These flexible couplings 31 are held in proper operative position with the nozzle arranged adjacent the tire and the ground slightly forward of the contact point of the wheel therewith by means of a spring 33, as shown in Figure 5.

The rear laterals are also provided with similar wheel pipes 34 carrying nozzles 35 and embodying as a part of each a flexible joint 36 arranged over the wheel for a purpose hereinbefore described.

On the opposite side of the supply tank from the outlet pipe 19, is a secondary outlet 37 connected to the hollow shaft 38 of a hose-reel 39, upon which hose 40 may be wound and connected to the hollow shaft in any suitable manner. This hose may be utilized for inflating the tires or for cleaning the car, operating the revolving brushes or polishers or for any other suitable purpose for which compressed air may be utilized. If desirable, I may also connect the hose to one of the inlet ports 12 or 13 of the compressor so as to get a vacuum suction, and in which instance I have applied to one end of the hose a suction head. In this case of course there would be an air filter located intermediate the length of the pipe or a dust-collector of any suitable character.

There may also be connected to the supply tank a gauge by which the amount of air in the tank may be readily determined by the operator of the vehicle. It is also well known that safety valves may be operated to control automatic cut-offs for the motor current; such an arrangement can be applied to the present safety valve if desired, but as it forms no part of my present invention I have not illustrated the same.

What I claim is:

1. In combination with a vehicle frame and supporting wheels therefor, a source of air under pressure carried by said frame, a pipe associated with each of the wheels and in communication with the source of air, said pipe straddling the associated wheel from above and terminating closely adjacent the lowermost point of the wheel and slightly forward of the contacting portion of the wheel, a portion of said pipe immediately adjacent the wheel being flexible.

2. In combination with a vehicle frame and supporting wheels therefor, a source of air under pressure carried by said frame, a pipe associated with each of the wheels and in communication with the source of air, said pipe straddling the associated wheel from above and terminating closely adjacent the lowermost point of the wheel and slightly forward of the contacting portion of the wheel, the portion of the pipe above the wheel being flexible.

3. The combination with a vehicle body and a supporting wheel therefor associated with a steering knuckle, a coupling carried by the knuckle, a pipe leading from the coupling and straddling the wheel from above and terminating adjacent the lowermost point of the wheel, a source of air under pressure carried by the vehicle, and a pipe leading from said source to the coupling.

In testimony whereof I hereunto affix my signature.

JOHN WILLIAM NETHERTON.